Sept. 22, 1942.    T. L. MAYRATH    2,296,290
POWER TRANSMISSION MECHANISM
Original Filed Sept. 15, 1939    5 Sheets-Sheet 1
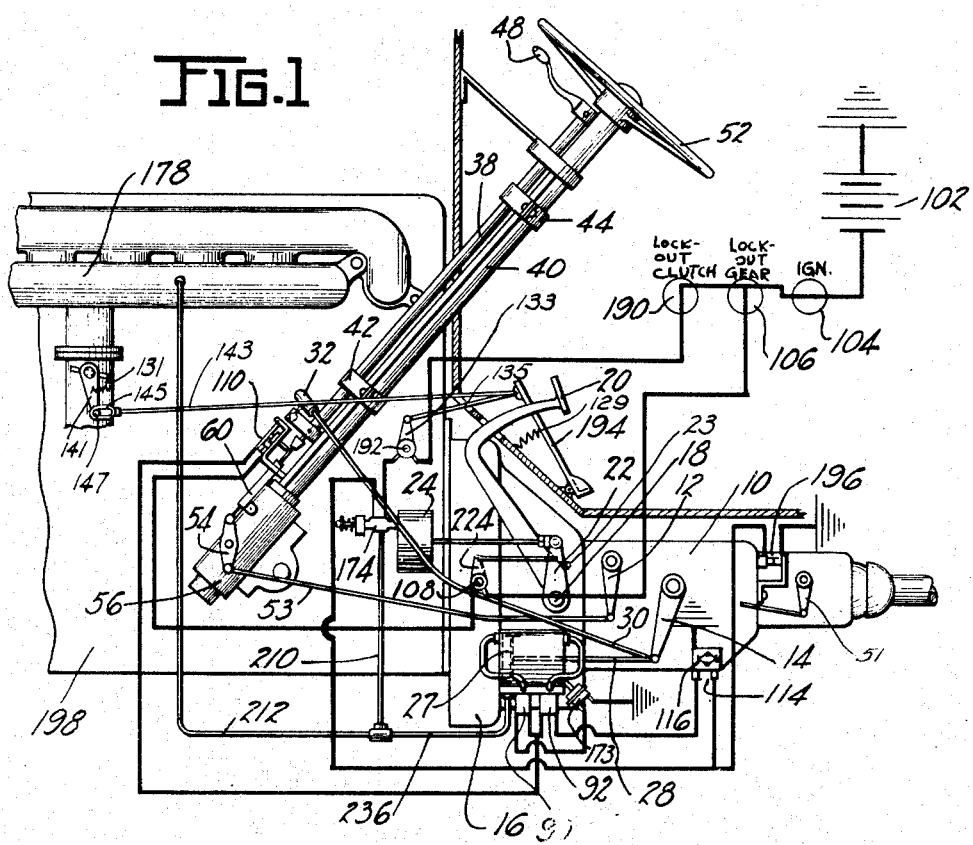
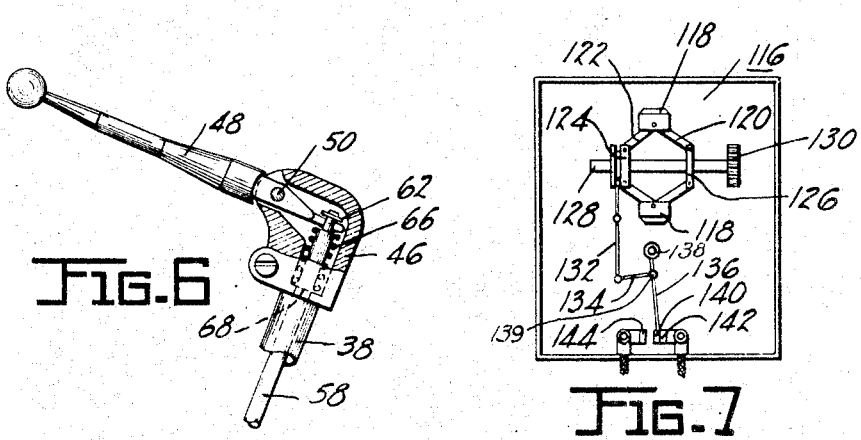
INVENTOR.
THOMAS L. MAYRATH
BY
H. O. Clayton
ATTORNEY.

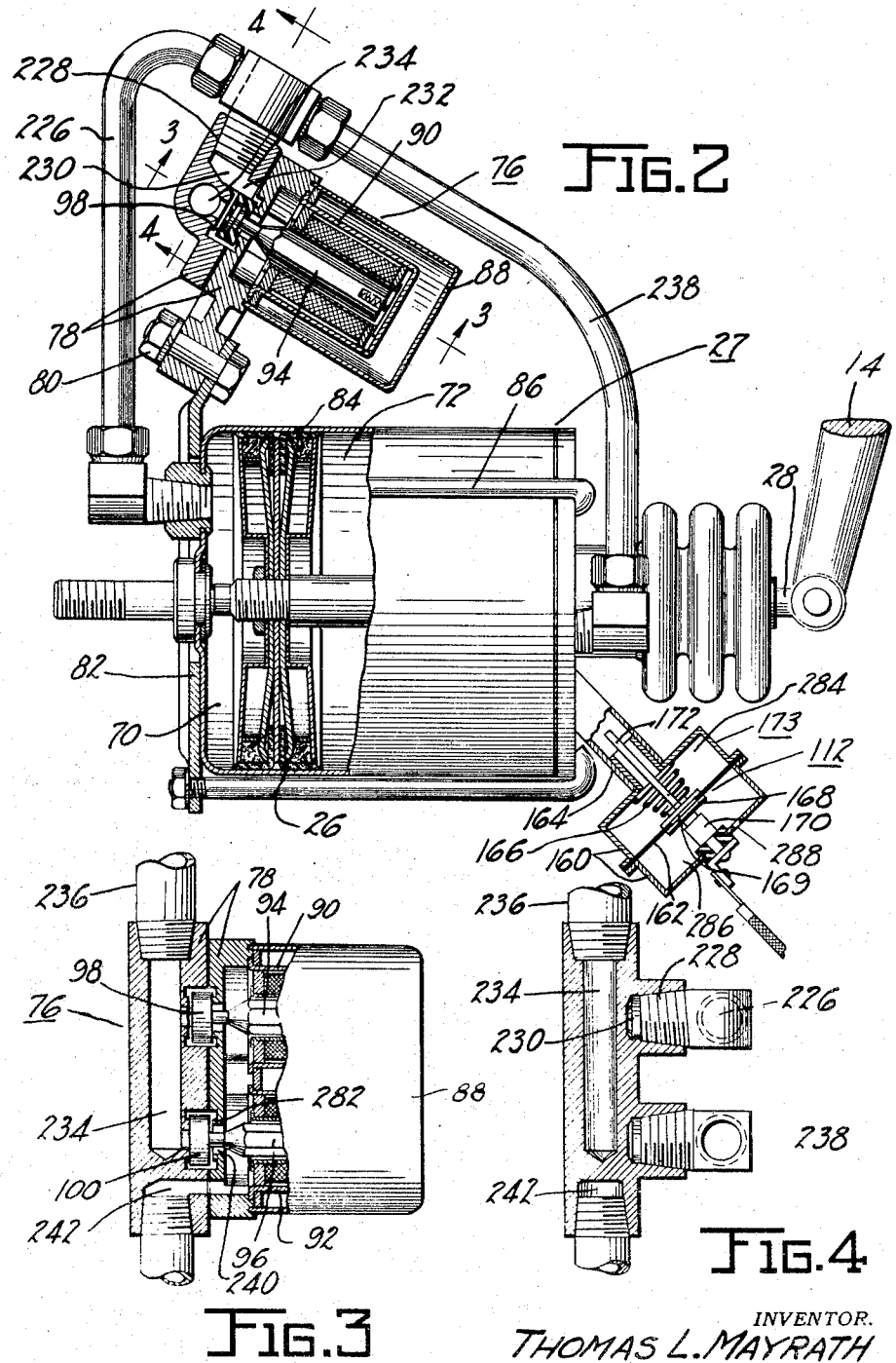

INVENTOR.
THOMAS L. MAYRATH
BY H. O. Clayton
ATTORNEY.

Sept. 22, 1942.  T. L. MAYRATH  2,296,290
POWER TRANSMISSION MECHANISM
Original Filed Sept. 15, 1939   5 Sheets-Sheet 5

INVENTOR
THOMAS L. MAYRATH
BY
ATTORNEY

Patented Sept. 22, 1942

2,296,290

UNITED STATES PATENT OFFICE 2,296,290

POWER TRANSMISSION MECHANISM

Thomas L. Mayrath, Dayton, Ohio, assignor to Bendix Aviation Corporation, South Bend, Ind., a corporation of Delaware Original application September 15, 1939, Serial No. 295,003. Divided and this application November 18, 1941, Serial No. 419,650

7 Claims. (Cl. 192—.01)

This invention relates in general to the power transmission mechanism of an automotive vehicle and in particular to means for coupling the internal combustion engine with the change-speed transmission of the vehicle.

The most important object of my invention is to provide two cooperating coupling means for controlling the transmission of power from the internal combustion engine, or other prime mover of an automotive vehicle, to the change-speed transmission of said vehicle, one of said coupling means constituting a fluid coupling of conventional design including a driving member or impeller and a driven member or rotor and the other of said coupling means constituting a disk plate clutch, said clutch being operated by a multi-stage pressure differential operated motor, the first stage of clutch engaging operation of said motor being terminated when the clutch plates contact, this operation being completed before the throttle of the engine is opened or just as the opening of the throttle is initiated.

One of the most important objects of the invention is to provide, in an automotive vehicle equipped with a fluid clutch, means, including but two manually operated controls, for obtaining the greatest efficiency and effectiveness of operation of said clutch and at the same time eliminating an objectionable feature caused by said clutch, namely, the creeping of the vehicle after it has been brought to a stop.

Yet another object of the invention is to provide, in an automotive vehicle equipped with a fluid clutch, a friction clutch and a change-speed transmission, but three members, namely, the accelerator, a clutch pedal and a lever preferably mounted beneath the steering wheel of the vehicle, for controlling the operation of the two clutches, the throttle and the transmission of the vehicle, the throttle being operated solely by the physical effort of the driver, the friction clutch by either the physical effort of the driver or power and the transmission partly by the physical effort of the driver of the vehicle and partly by power, to which power may be added the physical effort of the driver.

Yet another object of the invention is to provide, in combination with a friction clutch and a fluid clutch or so-called fluid-drive such as the type of fluid clutch now being used on the Chrysler Custom Imperial automobile, means for operating a change-speed transmission positioned between said clutch and the drivewheels of the vehicle, said transmission operating means being operative to automatically place the transmission in second gear when the speed of the vehicle drops to or below a predetermined factor and to automatically place the transmission in high gear when the speed of the vehicle exceeds said factor.

Yet another object of the invention is to provide, in an automotive vehicle, a power transmission for interconnecting the internal combustion engine and the driving wheels of the vehicle, said transmission including a fluid clutch, a change-speed transmission and a spring operated disk plate clutch, the latter being interposed between the fluid clutch and the change-speed transmission, said mechanisms being actuated by cooperating power means and physically operated means, the power means for actuating the transmission being operative to automatically place the transmission in either a relatively low gear ratio setting or a relatively high gear ratio setting, depending upon the speed of the vehicle, and the power means for actuating the friction clutch functioning automatically to disengage the clutch when the speed of the vehicle is below a certain factor and the accelerator is at the time released and also functioning to cooperate with the fluid clutch in effecting a smooth coupling of the engine and transmission.

A further object of the invention is to provide, in an automotive vehicle equipped with an internal combustion engine, a fluid coupling, a change-speed transmission and a friction clutch located between the transmission and coupling, power and manually operated means for operating the clutch and the transmission and means for controlling the operation of the engine, the clutch, the coupling and the transmission including an accelerator and a vehicle speed responsive governor, the parts of this mechanism being so constructed and arranged as to effect a two-stage clutch engaging operation of the friction clutch by its power operating means after the transmission has been manually established in one of its low gear settings, this clutch engaging operation of the power means cooperating with the fluid coupling to effect a smooth start of the vehicle from rest.

It is also an object of my invention to so construct and arrange parts of this mechanism that said mechanism is operable, after the vehicle is under way, to automatically operate the transmission solely under the control of the accelerator and the governor, this automatic operation of the transmission being effected without an operation of the friction clutch.

Other objects of the invention and desirable details of construction and combinations of parts will become apparent from the following description of a preferred embodiment, which description is taken in conjunction with the accompanying drawings, in which:

Figure 1 is a diagrammatic view of the clutch and transmission operating mechanism constituting my invention, the hand operated selector beneath the steering wheel being moved 90° out of position to make possible a disclosure of said selector;

Figure 2 is a view, largely in section, disclosing in detail the transmission operating motor and its control valve mechanism;

Figure 5:
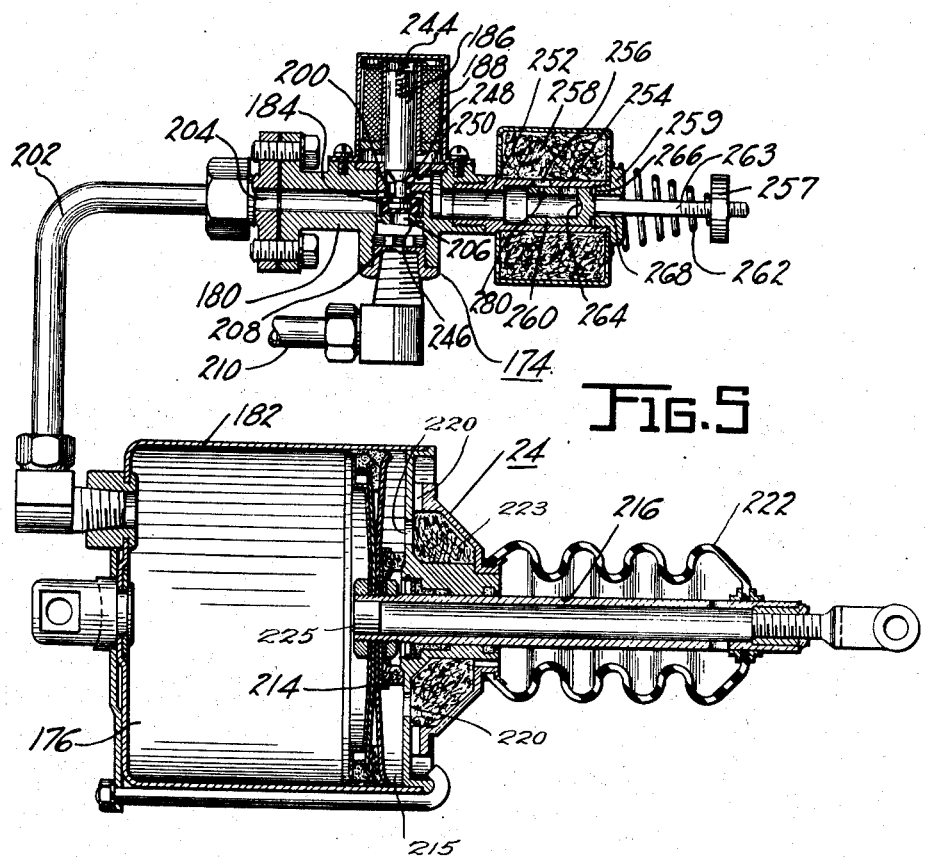
Figure 8:
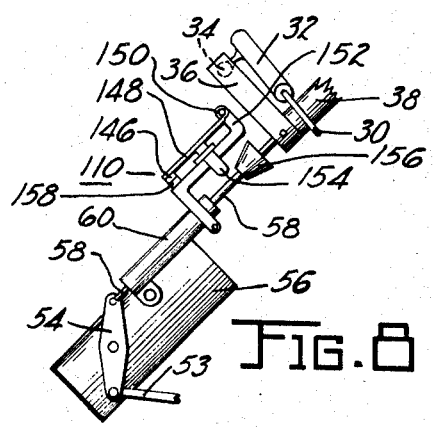
Figure 9:
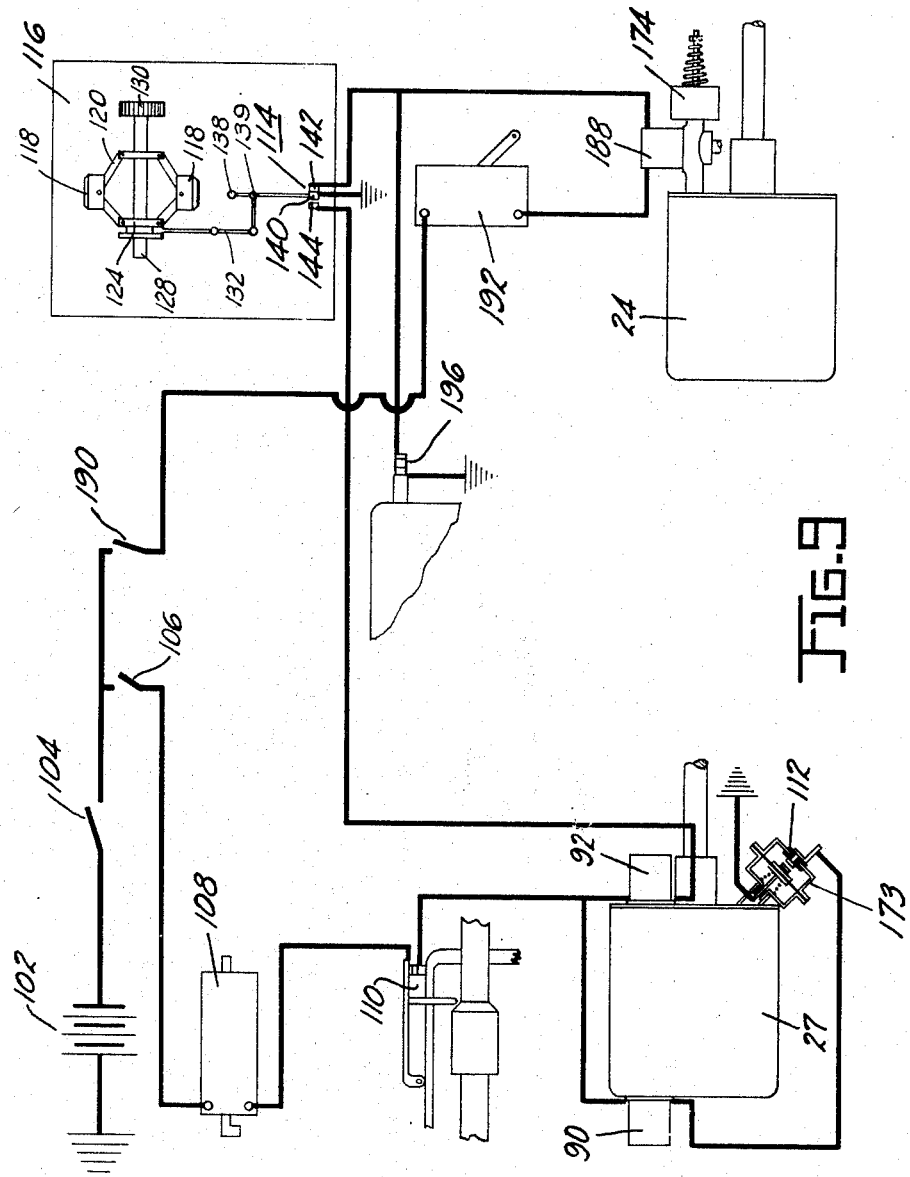
Figure 10:
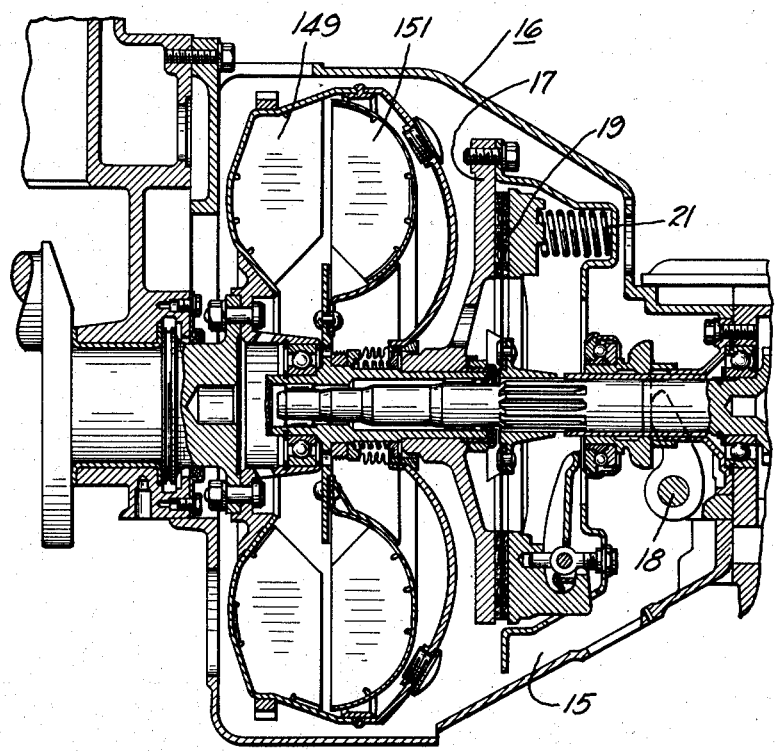

Figures 3 and 4 are views, taken on the lines 3—3 and 4—4 of Figure 2 respectively, disclosing details of part of the valve mechanism for controlling the transmission operating motor of my invention;

Figure 5 is a sectional view of the clutch operating motor and its control valve mechanism;

Figure 6 is a view, partly in section, of the transmission controlling selector lever preferably secured to the steering post beneath the steering wheel;

Figure 7 is an enlarged view of the propeller shaft operated governor and the switch operated thereby, said governor serving to control both the clutch and the transmission operating power means;

Figure 8 is a view disclosing in detail the cross-shift lock-out switch of my invention;

Figure 9 is another diagrammatic view of my invention disclosing, in particular, the electrical hook-up; and Figure 10 is a sectional view disclosing in detail the fluid coupling and friction clutch constituting an important part of the mechanism of my invention.

Referring now to Figure 1, disclosing a preferred embodiment of my invention, a three-speeds forward and reverse transmission 10 is operated by means of cranks 12 and 14, the crank 12 serving to operate the shift rail selecting mechanism of the transmission and the crank 14 serving to operate that part of the transmission functioning to move the selected rail to establish the transmission in the desired gear ratio. The transmission includes a second and high gear shift rail and a low and reverse gear shift rail and such a transmission, that is, one provided with two shift rails, a crank for operating the rail selecting mechanism and another crank for actuating the shift rail operating mechanism, is of conventional design. No claim is made to this transmission accordingly no need is seen for disclosing it in detail.

My invention has to do with the manually and power operated mechanism for actuating the cranks 12 and 13, which mechanism is to a degree interlocked with manually and power operated mechanism for operating a conventional friction clutch 15 having a driving plate 17 and a driven plate 19 forced into engagement by clutch springs 21. The friction clutch, which is disclosed in detail in Figure 10, is of conventional design; accordingly, no claim is made thereto.

An important feature of my invention lies in the combination of a fluid clutch or so-called fluid coupling 16, such as that now being used on the 1939 Chrysler Custom Imperial automobile, a multi-stage motor for operating the aforementioned friction or so-called disk plate clutch and the interlocked transmission and disk plate clutch operating mechanism. The disk plate clutch is operably connected to a clutch throw-out shaft 18, to which is connected a foot operated clutch pedal 20 and a crank 22 actuated by a vacuum motor 24. The clutch pedal 20 is preferably rotatably mounted on the shaft 18 and is connected to said shaft by a lost motion connection including a bent pin 23 fixedly secured at one of its ends to the pedal 20 and contactible at its other end with the crank 22. With this mechanism the clutch pedal remains stationary when the clutch is disengaged by the clutch operating power means, the shaft 18, however, being rotated to disengage the clutch when the pedal is depressed.

Describing now in detail the transmission operating mechanism of my invention, a piston 26 of a double-ended double-acting vacuum operated motor 27, disclosed in Figure 2, is connected to the shift rail operating crank 14 by a rod 28. The crank 14 may also be rotated by manually operated means including a rod 30 having an enlarged end member 32, as disclosed in Figures 1 and 8. To the end of the member 32 there is secured a spherically-shaped member 34, fitting within a recess in the end of a crank 36 secured to the end of a tube 38, the latter being secured to the steering post 40 of the vehicle by brackets 42 and 44. As disclosed in Figures 1 and 6, a hollow housing member 46 is secured to the end of the tube 38 and a selector lever 48 is pivotally mounted at 50 to said member. Rotation of the selector 48, in a plane parallel to the steering wheel 52 of the vehicle, serves to rotate the tube 38 connected thereto which, in turn, through the intermediary of the crank 36 and its universal connection with the member 32, places the rod 30 either in tension or in compression to rotate the shift rail operating crank 14. This mechanism for manually operating the crank 14 constitutes an important feature of my invention, for with such a mechanism said crank may be operated manually in the event of failure of the power means. Furthermore, as will be made evident hereinafter, this mechanism provides the sole means for placing the transmission either in low gear or in reverse gear.

The crank 12, which operates the shift rail selecting mechanism, is rotated by the manually operated mechanism disclosed in Figures 1, 6 and 8. This mechanism includes a rod 53, preferably connected to a lever 54 pivotally mounted on a support 56 for the steering post. To one end of the lever 54 there is pivotally connected a rod 58, which extends through a housing member 60, also secured to the support 56. From the member 60 the rod 58 extends through the tube 38 and is provided, at its upper end, with a pin 62. One end of the selector 48 is provided with an opening, and the selector is, as disclosed in Figure 6, sleeved over the pin 62. A spring 66, surrounding the rod 58 and interposed between a seat 68 in the housing member 46 and the end of the selector, serves to move or bias the rod upwardly and thereby maintain the crank 12 in position to effect a second or high gear operation of the transmission; that is, unless the driver of the vehicle rotates the selector upwardly or counterclockwise, in a plane perpendicular to the plane of the steering wheel, the compressed spring 66 serves to maintain the selector in position preparatory to placing the transmission either in second or in high gear by the power means described in detail hereinafter. The manual operation of the transmission to establish the same in either reverse gear or low gear is accomplished by rotating the selector in a plane parallel to the plane of the steering wheel. There are thus three operative positions in which the selector is most often placed with the mechanism of my invention. One of these positions is described above wherein the selector is biased by the spring 66 to a position preparatory to effecting a power operation of the transmission. This may be termed the automatic or power position of the selector; and the two other positions in which the transmission is most often placed are its low gear and reverse gear positions. Of course, the selector may also be placed in a transmission neutral position and should all of the power means fail the selector may be manually moved to establish the transmission in either second gear or high gear.

Describing now the valvular mechanism for controlling the operation of the transmission operating motor 27, the piston or power element 26 of the motor divides the same into two compartments 70 and 72. The gaseous pressure within these compartments determines the differential of pressures acting upon the piston to move it to rotate the crank 14 clockwise or counter-clockwise, and thus establish the transmission in gear. This gaseous pressure is controlled by a valvular unit 76, diclosed in detail in Figures 2, 3 and 4, said unit including a two-part body member 78, clamped by blots 80 to a bracket 82 secured to the casing 84 of the motor 27 by rods 86. To the body member 78 of the valve unit there is secured a housing 88 within which are secured solenoids 90 and 92. To the armatures 94 and 96 of said solenoids there are secured valve members 98 and 100 respectively.

Describing now the electrical circuits and switches for controlling the operation of the solenoids 90, the connection between a grounded battery 102 and the ground to complete the circuit includes an ignition switch 104, a dash-mounted lock-out or cut-out switch 106, a clutch operated breaker switch 108, a so-called cross-shift lock-out switch 110, solenoid 90 and a power operated switch 112. These switches are, as disclosed in Figure 9, connected in series. As to the solenoid 92, which is in parallel with the solenoid 90, the circuit includes the aforementioned switches 104, 106, 108 and 110, the solenoid 92 and a two-pole switch 114 operated by a propeller shaft operated fly-ball governor 116 of any well-known design.

Such a governor is disclosed in Figure 7, wherein the flyballs 118 are, through the intermediary of links 120 and 122 and collars 124 and 126, actuated by a shaft 128, to which shaft there is secured a gear 130 meshed with a gear, not shown, driven by the propeller shaft of the vehicle or means connected thereto. The collar 124 is provided with a groove receiving one end of a lever 132 pivotally connected to a link 134, which is pivotally connected to a lever 136 fulcrumed at 138. The end of the lever 136 constitutes a contact member 140 alternately movable into contact with either contact 142 or contact 144, depending of course upon the speed of the vehicle. When the vehicle is moving at, say, five M. P. H. or less, lever 136 is moved so as to bring contacts 140 and 142 into engagement; whereas, when the vehicle is moving at, say, fifteen M. P. H. or at a higher speed, said lever is moved so as to bring contacts 140 and 144 into engagement. The governor and its connections, to which no claim is made, may of course be adjustable to effect the desired operation of the switch. For example, the connection 139 between the link 134 and the lever 136 may be made adjustable and with such a construction the time of operation of the switch is determined by the distance of said connection from the fulcrum of the lever 136.

Describing now in detail the cross-shift switch 110, which is disclosed in detail in Figure 8, the same comprises a contact 146 mounted on one end of a lever 148 pivoted at 150 to a bracket 152. The bracket is secured to the housing member 60 and is provided with an opening to receive a pin 154 secured to the lever 148. The end of said pin is rounded to cooperate with a cone 156 fixedly secured to the rod 58. When the selector 48 is rotated counterclockwise, in a plane perpendicular to the plane of the steering wheel, the rod 58 and its connected cone 156 are moved downwardly, thus forcing the cone into contact with the pin 154 to move the latter outwardly. This operation serves to rotate the lever 148 about its fulcrum to thus move the contact 146 out of engagement with a contact 158 and break the circuit to the solenoid 90.

The power operated switch 112, disclosed in detail in Figure 2, includes a two-part housing 160. Between the parts of the housing there is secured a diaphragm 162, and the housing is secured by a tube 164 to the casing 84 of the motor 27. A spring 166 serves to urge a contact 168, secured to a metallic plate 169 fixed to the diaphragm 162, into contact with a contact 170, which is wired to solenoid 90. A pin 172, secured to the diaphragm 162 and part of contact 168, is wired to the chassis of the vehicle to effect a ground connection. The housing 160 and the diaphragm 162 together constitute a pressure differential operated motor 173 for operating, together with the spring 166, the switch 112: accordingly, the switch may be said to be power operated.

The cut-out or so-called lock-out switch 106 and the clutch operated switch 108 are not disclosed in detail, inasmuch as they are merely breaker switches of conventional design.

Describing now the power means, Figure 5, for operating the disk plate clutch, a three-way valve unit 174 serves either to connect a compartment 176 of the motor 24 to the atmosphere to de-energize the motor and thereby permit the clutch springs to maintain the clutch engaged or to connect said compartment to a source of vacuum, preferably the intake manifold 178, to partially evacuate the compartment and thus energize the motor to effect a disengagement of the clutch. As disclosed in Figure 1 and as diagrammatically disclosed in Figure 5, the three-way valve, which will be described in greater detail hereinafter, includes a casing 180 secured to the casing 182 of the motor 24, said casing 180 housing a valve member 184 secured to the end of an armature 186 constituting the movable part or power element of a solenoid 188. The solenoid is energized to move the armature upwardly by closing an electrical circuit including, in series, the ignition switch 104, a cut-out or breaker switch 190, preferably mounted on the dashboard of the vehicle, a breaker switch 192 operated by the accelerator 194 of the vehicle, the solenoid 188 and a breaker switch 196 operated by the second and high gear shift rail to open or break the switch when and only when the transmission is in high gear. At all other times the switch 196 is closed, that is, when the transmission is in reverse gear, second gear, low gear or neutral. These breaker switches are not disclosed in detail, inasmuch as no claim is made thereto: furthermore, they are well known to those skilled in this art.

It may be stressed here that the governor operated switch 114, disclosed in detail in Figure 7, constitutes one of the important features of my invention; for with this mechanism there is provided an interlock between the clutch and transmission operating mechanisms. As to the interrelation of the switches 114 and 196, when the contacts 140 and 142 are engaged, that is, when the speed of the vehicle is equal to or less than five M. P. H., a ground connection is made, irrespective of whether or not the switch 196 is open or closed. This interlock feature will be referred to hereinafter.

Describing now the complete operation of the transmission and clutch operating mechanism constituting my invention, and incidentally completing the detailed description thereof, we will assume the dash-mounted switches 104, 106 and 190 to be closed and the internal-combustion engine 198 to be idling, thereby creating a partial vacuum in the intake manifold 178 of the internal-combustion engine. The accelerator 194 is at the time released, thereby closing the breaker switch 192. Furthermore, the cross-shift switch 110 is closed, inasmuch as the selector 48 is at the time biased by the spring 66 to its second and high gear cross-shift position. Incidentally, the selector is, in Figure 1, shown 90° out of position for the purpose of more clearly disclosing the invention. The switch 196 is at the time closed, inasmuch as the transmission is not in high gear. The power operated switch 112 is at the time closed by power means, that is, the spring 166, and the contacts 140 and 142 of the switch 114 are in engagement, inasmuch as the vehicle is at a standstill.

Continuing the description of the operation of the mechanism and assuming the parts of the same to be in the positions set forth above, the solenoid 188 of the clutch operating mechanism will be energized, thus moving the valve member 184 upwardly to seat said member upon a valve seat 200. The compartment 176 of the clutch operating motor 24 will then be partially evacuated, for there is provided a fluid transmitting connection between the said compartment and the intake manifold via a conduit 202, a duct 204 in the valve casing 180, ports 206 and 208 in said casing and conduits 210 and 212 leading to the intake manifold 178. The piston 214 of the intake clutch motor 24 is thus subjected to a differential of pressures, for a compartment 215 of the motor is at the time subjected to atmospheric pressure via openings 220 in the end plate structure of the cylinder 182. The air passing through said openings is filtered by suitable means such as steel wool 223 or its equivalent. A plug 225 is inserted in the inner end of the rod 216 to prevent the withdrawal of air from the interior of said rod. The piston 214 is accordingly moved to the left to effect a disengagement of the clutch, and when the clutch is disengaged a crank 224, Figure 1, is moved sufficiently to close the switch 108.

The closing of the switch 108 closes the circuit including the solenoid 90; accordingly, the latter is energized. The armature 94 is thus moved to the position disclosed in Figures 2 and 3, opening the valve 98 and interconnecting the compartment 70 of the transmission operating motor 27 with the intake manifold via a conduit 226, port 228 in the valve body member, a duct 230, a port 232 and a duct 234 in said member, and a conduit 236 leading to the conduit 212, which leads to the intake manifold. The compartment 70 being connected to the intake manifold is immediately partially evacuated and the piston 26 is moved to the left, to the position disclosed in Figures 1 and 2, to thereby rotate the crank 14 and place the transmission in second gear that is effect what may be termed a down-shift operation of the transmission. The piston 26 moves to the left, Figure 2, for it is then subjected to a differential of pressures, compartment 72 of the motor 27 being at the time vented to the atmosphere via a conduit 238 and ports 240 and 242, Figure 3.

After the transmission is established in second gear, the accelerator is then depressed to speed up the engine and engage the clutch. Describing the clutch engaging operation of the motor 24, when the accelerator is depressed, the switch 192 is opened, thereby deenergizing the solenoid 188, permitting a spring 244 to move the armature 186 and its connected valve member 184 downwardly, the latter member seating upon a valve seat 246. The compartment 176 of the motor 24 is then vented to the atmosphere via conduit 202, duct 204, a port 248, ducts 250 and 252, ports 254 and 256 and the air cleaner 258. The ports 254 and 256 register to effect this result, for when the clutch springs begin to move the driving clutch plate toward its clutch engaged position in contact with the driven plate of the clutch, that is, when the piston begins its movement to the right, Figure 5, there is created by the action of the springs a partial vacuum in the compartment 176 and the aforementioned fluid transmitting connections interconnecting said compartment with the duct 252. A reciprocable tubular valve member 260, biased to the position disclosed in Figure 5 by a spring 262, is moved to the left, Figure 5, to effect the aforementioned registering of ports 254 and 256. The spring 262 is sleeved over a stem 263, secured to and extending from one end of said valve member, and is interposed between a nut 257, threadedly mounted on the stem 263, and a plug 259. This movement of the valve member 260 to the left is effected, inasmuch as said member is at the time subjected to a differential of pressures overcoming the effect of the spring 262; for the duct 252 is partially evacuated, thus subjecting the inner face 264 of the valve member to the rarefied air, and the outer face 266 of the valve member is vented to the atmosphere via an opening 268 in the plug 259. When the clutch plates contact, the movement of the driving clutch plate is appreciably slowed down, immediately resulting in an appreciable increase of the gaseous pressure within the compartment 176. The spring 262 then moves the valve member 260 to the right to the position disclosed in Figure 5, a relatively small port 280 in the valve member coming into registry with the port 256. A relatively slow bleed of air into the compartment 176 is then initiated. There is thus effected two distinct stages of movement of the driving clutch plate as it moves into complete engagement with the driven clutch plate, the first stage being relatively fast by virtue of the rapid inrush of air into the compartment 176 and the second stage being relatively slow by virtue of the relatively slow bleed of air into said compartment via the registered ports 280 and 256. The time of operation of the valve member 260 may be regulated by an adjustment of the nut 257, which determines the load exerted by the spring upon the valve. The fluid coupling 16 cooperates with the friction clutch operating two-stage motor 24 for, as described in greater detail hereinafter, said fluid coupling cushions the shock when the driving clutch plate of the friction clutch contacts the driven plate of said clutch; furthermore, the fluid clutch cooperates with the clutch control motor to effect the desired smooth engagement of the friction clutch, that is the desired acceleration of the vehicle during the aforementioned second stage clutch engaging operation of said motor.

The clutch being engaged, the accelerator is depressed to speed up the engine to effect the desired speed of the vehicle. When this speed equals, say, fifteen M. P. H. or the top setting of the governor 116, whatever it may be, the contacts 140 and 144 engage each other, making possible a high gear operation of the transmission.

At this juncture attention is directed to the most important feature of my invention, that is the construction and arrangement of the parts of the fluid coupling and clutch operating power means and the operation of this mechanism to effect a smooth start of the vehicle from rest. Referring to Figure 1 of the drawings it will be noted that the accelerator pedal 194, which is biased to its released position by a return spring 129, is connected to a throttle valve operating crank 141 by means of a so-called lost motion connecting means. The crank 141 is biased to its throttle valve closed position by a return spring 131. The lost motion connecting means constitutes a link 143 having a slotted end portion 145 through which extends a pin 147 on the end of the crank 141. Now this lost motion connection is provided in order that upon depressing the accelerator, to effect a clutch engaging operation of the clutch motor 24 and an operation of the throttle, the first increment of movement of the accelerator results in an opening of the switch 192. A crank 133, operably connected to the switch 192, is connected by a link 135 to the accelerator 194. As previously described in detail the valve 184 is then immediately operated to initiate the clutch engaging operation of the motor 24 and the valve 260 is automatically closed to terminate the rapid first stage of movement of the piston 214 when the clutch plates contact. This operation is completed very quickly and during the period of time usually taken to take up the lost motion provided by the member 145.

Further movement of the link 143 by the depression of the accelerator results in an opening of the throttle to speed up the engine, and the speeding up of the engine results in a speeding up of the impeller 149, that is the driving element of the fluid coupling 16. Prior to this speeding up of the impeller the rotor 151, or driven element of the coupling, and the impeller were rotating at the same speed, that is the engine idling speed. The relative movement between the impeller and rotor resulting from the speeding up of the engine effects an increase in speed of rotation of the rotor, for the power fluid within the coupling is then impinged, that is forced against the plates of the rotor resulting in this increase in speed of rotation. Now, it will be remembered that the opening of the throttle to increase the engine torque and to speed up the impeller takes place immediately after or substantially concurrently with the contacting of the clutch plates. Accordingly, as the second, that is relatively slow stage of clutch engaging operation is taking place, to progressively increase the loading of said plates, the fluid coupling is then transmitting the engine torque to the driven clutch plate.

If, for any reason the valve 260 should fail in its function of automatically terminating the rapid first stage movement of the piston 214 when the clutch plates contact at the desired loading, then the clutch plates would be severely loaded which would, in the absence of a fluid coupling, probably result in a stalling of the engine. The coupling, however, acts as a yieldable member and if the accelerator is not sufficiently depressed to effect the necessary engine torque then the coupling, by virtue of the shearing action of the power fluid therein, will prevent a stalling of the engine. It also follows that if the clutch operating power means is inoperative, then a manual clutch engaging operation of the friction clutch is, because of the above described construction and operation of the parts, facilitated by the presence of the coupling.

It is also to be noted that if the opening of the throttle were not delayed then there would result an undesirable speeding up of the rotor 151, and the driving clutch plate 17 connected thereto, before the clutch plates contact, and this would result in an undesirable forward jerk of the vehicle when said plates first contact. With my invention the length of the slot 145 is preferably such as to insure, throughout the life of the clutch plates, a contacting of said plates either immediately before or at substantially the same time as the driving clutch plate 17 is speeded up. It is probably better to initiate the speed-up operation of the plate 17 after the clutch plates have contacted than before said clutch plates have contacted; however, in any event, with my invention there is neither a stalling of the engine nor a jerking of the vehicle, for the rubber-band-like yielding action of the fluid coupling obviates these undesirable results.

Continuing the description of the operation of the mechanism of my invention, should the driver desire to effect an up-shift operation of the transmission, that is a shift of the transmission into high gear, he merely has to release the accelerator, for a release of the accelerator results in a closing of the switch 192, and since the transmission is then in second gear the switch 196 is closed. The circuit to the solenoid 188 is accordingly closed and the three-way valve 174 again operated to open the valve. The motor 24 is accordingly again energized, the friction clutch is disengaged and the switch 108 is again closed.

Describing now an important feature of my invention, when the switch 108 is closed and the contacts 140 and 144 of the switch 114 engaged, the circuit including the solenoid 92 is completed, resulting in an energization of said solenoid. The armature 96 of the solenoid 92 is thus moved to the right, Figure 3, to seat the valve member 106 upon a seat 282 and connect the compartment 72 of the motor 27 with the intake manifold. As soon as the evacuation of the compartment 72 is initiated, a compartment 284 of the switch operating motor 172 is also evacuated, for the compartments 72 and 284 are interconnected by the tube 164. The diaphragm 162 is then subjected to a differential of pressures, for a compartment 286 of the motor is vented to the atmosphere via an opening 288 in the housing 160. The diaphragm 162 is thus moved upwardly, Figure 2, to open the switch 112 and deenergize the solenoid 90. The compartment 70 of the motor 27 is thus vented to the atmosphere and there results a movement of the piston 26 to the right to effect a clockwise rotation of the crank 14 to place the transmission in high gear.

The transmission having been established in high gear, the accelerator is again depressed to effect a clutch engaging operation of the motor 24 and an opening of the throttle to speed up the vehicle. Assuming the vehicle to be traveling at or above fifteen M. P. H. to maintain the contact 140 away from contact 142, subsequent release of the accelerator will not effect a clutch disengaging operation of the motor 24, for it will be remembered that when the transmission is in high gear the second and high gear shift rail functions to open the switch 196. Both the solenoid 188 and the motor 24 are accordingly deenergized and the clutch remains engaged. However, should the speed of the vehicle be reduced to five M. P. H. or less, and the transmission remain in high gear, the circuit necessary to energize the solenoid 188 will be completed and the clutch will be automatically disengaged.

There is thus provided manually and power operated means for operating both the friction clutch and the change-speed transmission of the automobile, such means cooperating with the fluid clutch 16, which is placed ahead of the friction clutch in the power transmitting connection between the internal combustion engine and the drivewheels of the vehicle. With the clutch and transmission operating mechanism of my invention, the friction clutch is automatically disengaged and the transmission is automatically placed in second gear that is shifted down when the vehicle is stopped and the accelerator is released. Upon depressing the accelerator, the friction clutch is engaged and the vehicle is placed in motion, the torque being transmitted through the fluid clutch 16; and as previously described the two-stage engagement of the friction clutch by means of the motor 24 cooperates with the fluid coupling in effecting a smooth start of the vehicle from rest. The fluid coupling cooperates with the transmission operating power means of my invention, for because of the so-called yielding operation of said coupling, described hereinafter, the car may be started from rest with the transmission established in a relatively high gear ratio setting.

If the friction clutch operating power means of my invention is either by accident or design rendered inoperative, then said clutch should be manually disengaged to facilitate the manual operation of the transmission in placing the same in either its low gear or its reverse gear setting, for if this is not done there would be difficulty in demeshing and meshing the gears of the transmission due to the operation of the fluid coupling. After the vehicle is under way there is then no need to disengage the friction clutch to effect a smooth low gear to second gear or second gear to high gear up-shift operation of the transmission by the motor 27, for when the accelerator is released to idle the engine the torque of the latter is reversed, that is, the engine is then no longer acting as a prime mover or source of power to drive the car.

This smooth up-shift operation of the transmission is then made possible by virtue of the reversal of the engine torque and the operation of the fluid coupling and a free-wheeling unit 51 referred to hereinafter. Explaining the operation of the latter mechanisms during this up-shift operation of the transmission the fluid coupling by virtue of the fluid therein acts as a yieldable member and the free-wheeling unit serves to unload the gears of the transmission from the then rotating propeller shaft of the vehicle. It follows, therefore, that despite the existing connection between the engine and the transmission as a result of the engagement of the friction clutch, the gears of the transmission may be easily demeshed and remeshed. It is also to be noted that if, for any reason, the free-wheeling unit 51 fails to operate, the fluid coupling would of itself yield sufficiently, when the accelerator is released to idle the engine, to make possible the aforementioned smooth up-shift operation of the transmission.

After the vehicle is under way in low gear the accelerator is then released to effect a disengagement of the clutch, a reversal of the engine torque and a closing of the switch 108. The clutch control cut-out switch 190 may then be opened to maintain the switch 108 closed to make possible a power operation of the transmission and the selector lever 48 is then moved to its automatic position to make possible the automatic operation of the transmission. If at the time the speed of the vehicle is sufficiently low to operate the governor operated switch 114 by closing the contacts 140 and 142 then the motor 27 will be energized to establish the transmission in its second gear setting, for the accelerator is at the time closed to make possible this energization, that is vacuum operation of said motor. A manual disengagement of the friction clutch is not necessary to effect this second gear operation of the motor 27, for when the engine torque is reversed by releasing the accelerator the fluid coupling 16 acts as a yieldable member in the force transmitting means interconnecting the engine and transmission, and because of this yielding action, which may be explained by the fact that at this time the impeller of the fluid coupling is churning the fluid and moving relative to the rotor of the coupling, very little resistance is encountered to hinder the demeshing operation and the meshing of a new set of gears to establish the transmission in its second gear setting, and it is to be remembered that upon closing the throttle by releasing the accelerator the vacuum within the intake manifold is increased, thereby making possible the energization of the motor 27. To establish the transmission in high gear, that is effect an up-shift operation thereof, the car is speeded up sufficiently to close the contacts 140 and 144 and the accelerator is released to reverse the engine torque and effect the necessary vacuum within the intake manifold to again energize the motor 27.

It is to be particularly noted that with the mechanism of my invention, there is provided a transmission operating mechanism which is controlled in large measure by the clutch pedal 20, the selector 48, the fluid coupling 16, the accelerator 194 and the vehicle speed responsive governor 114, for the accelerator controls the engine torque and the switch 192 and by closing the butterfly valve of the carburetor controls the source of vacuum. The selector is manually operated to place the transmission in low gear or reverse gear and is movable to a certain position to prepare the power operation of the transmission, the clutch pedal is used irrespective of whether or not the clutch operating power means is operative, the fluid coupling is operative to facilitate an operation of the transmission when the same is being established in either second gear or high gear and cooperates with the friction clutch to effect a smooth coupling of the engine and transmission and the governor operated switch is so electrically connected to the valve actuating electromagnetic means of the motor 27 that the governor with the cooperation of the accelerator control the operation of the said motor. And as heretofore described it is also to be particularly noted that it is not necessary for the clutch control motor 24 to function to make possible an operation of the transmission operating motor 27, for with the switch 108 closed said motor is completely controlled by the electrical means, the accelerator and the governor. With the clutch control mechanism in operation the accelerator and governor together with the clutch pedal, selector and fluid coupling constitute the principal controls for effectively operating the transmission. Here again, however, the transmission operating motor 27 is completely controlled by the electrical means, the accelerator and the governor. It is again stressed that when the clutch control is inoperative and the switch 108 is closed then a manual operation of the friction clutch in conjunction with the manual operation of the transmission and the operation of the fluid coupling effects a smooth start of the vehicle from rest and thereafter there is no need to operate said clutch, for the selector lever 48 is then placed in its automatic position, that is the position in which said lever is placed to make possible a power operation of the transmission, and the accelerator then becomes the only control means which must be manually operated to effect the remainder of the operation of the transmission. The fluid coupling would then facilitate the meshing and demeshing operation of the transmission in establishing the same in gear, the operation of said coupling cooperating with the accelerator in its reversal of the engine torque.

As to the need for a clutch pedal when the clutch control mechanism is operative the clutch should be disengaged by the operation of said pedal prior to cranking the engine, for until the engine is cranked the intake manifold is not evacuated; accordingly, the friction clutch is then engaged and if perchance the transmission is not in neutral then upon cranking the engine with the transmission in gear and the friction clutch engaged the car would move, or at least tend to move despite the yielding action of the fluid coupling. The clutch pedal is also needed to manually disengage the clutch when the transmission is in high gear above the clutch control governor speed, that is when the contacts 140 and 142 are not in engagement with each other.

As to the cooperation between the transmission operator of my invention and the fluid clutch, it is, of course, preferable to place the transmission in second gear rather than in high gear prior to starting the vehicle. With the mechanism heretofore described, this is automatically accomplished. Furthermore, it is particularly desirable, with the use of a fluid clutch, to place the transmission in high gear after the vehicle has been brought up to the desired speed, and my transmission operator automatically accomplishes this setting of the transmission by merely releasing the accelerator. The power operation of the transmission and friction clutch may be completely eliminated however by opening the dash-mounted cut-out switches 106 and 190. The operation of the vehicle is then limited to the manual operation of the accelerator, the selector 48, the clutch pedal and the brake pedal, the latter being applied to decelerate the vehicle and also being applied if the vehicle tends to creep after it is brought to a stop; and with the transmission and clutch operating power means completely inoperative there is no need for a manual disengagement of the friction clutch preliminary to effecting the manual operation of the transmission in shifting from second gear to high gear or from high gear to second gear, for the operation of the fluid coupling together with the reversal of the engine torque by the release of the accelerator makes possible this operation of the transmission without disengaging the friction clutch. If desired the vehicle may be provided with the aforementioned freewheeling unit which may be cut out of operation by mechanism including a crank 51 actuated by manually actuated linkage extending to the driver's compartment. Accordingly, when the driver wishes to render this free-wheeling mechanism operative, that is to provide a unidirectional drive, he rotates the crank 51 to its operative position. When the driver wishes to disable the free-wheeling mechanism, that is positively connect the driving shaft of the transmission with the propeller shaft of the vehicle, he moves the crank 51 back to its inoperative position. This free-wheeling mechanism which is usually an overrunning clutch, cooperates with the fluid clutch and/or the friction clutch in facilitating the operation of the transmission, for when the friction clutch is disengaged and the vehicle is in motion the transmission is isolated. Substantially the same effect results if the friction clutch is not disengaged, for the slipping fluid clutch transmits very little power when the engine is idling.

Discussing the cooperation between the power means for operating the clutch and the power means for operating the transmission, the governor 116 and the switch 114 operated thereby constitute parts common to both power means, said parts cooperating with the shift rail operated switch 196 and with the switch 112, which in part controls the shifter motor 27.

In brief, the cooperating change-speed transmission, the transmission and clutch operating means and the two clutches constituting my invention provide a very simple and compact mechanism for transmitting driving power from the internal combustion engine to the rear wheels of the vehicle, for there are but three manually operated controls: the accelerator, the clutch pedal and the transmission operating selector lever. The clutch pedal is of course seldom used. With the transmission in neutral the selector lever and accelerator are used to get the vehicle under way in low gear or reverse gear and with the vehicle under way, the selector lever in its automatic position, the clutch control inoperative and the switch 108 closed, it is then only necessary to operate the accelerator to control the speed of the vehicle for in starting the vehicle in low gear from rest the multi-stage clutch control cooperates with the fluid coupling in effecting the desired acceleration of the vehicle and with the vehicle in motion the accelerator, the governor and the fluid coupling cooperate with the transmission operating power means and the internal combustion engine in effecting the desired operations of the transmission and speed of the vehicle.

This application is a division of my pending application, Serial No. 295,003, filed September 15, 1939.

While one illustrative embodiment has been described, it is not my intention to limit the scope of the invention to that particular embodiment, or otherwise than by the terms of the appended claims.

I claim:

1. In an automotive vehicle provided with a power plant including an internal combustion engine having a carburetor provided with a throttle valve, a friction clutch having a driving element and a driven element, a fluid coupling interposed between the engine and the friction clutch and having a driving element connected to the engine and a driven element connected to the driving element of the friction clutch, and an accelerator for controlling the operation of the throttle and for controlling the fluid coupling through the intermediary of the internal combustion engine, power means for operating said friction clutch comprising a pressure differential operated motor, valve means for controlling the operation of said motor comprising a three-way valve operable to initiate the clutch disengaging and engaging operations of said motor, a switch connected to the accelerator said switch constituting means operated by the accelerator for in part controlling the operation of said three-way valve, other valve means for so controlling the operation of said motor as to effect a plurality of stages of movement of the power element of said motor during the clutch engaging operation thereof, means providing a lost motion connection between the accelerator and throttle valve, the parts of said mechanism being so constructed and arranged that the three-way valve is operated to initiate a clutch engaging operation of said motor during the first increment of throttle opening movement of the accelerator and before said throttle is opened to speed up the engine and thereby effect the operation of the fluid coupling.

2. In an automotive vehicle provided with a power plant including an internal combustion engine, a manually operable selective gear transmission, a power operated friction clutch located forwardly of the transmission, said clutch including a driving plate and a driven plate, a fluid coupling, including an impeller connected to the engine and a rotor connected to the aforementioned driving plate, interposed between the engine and the friction clutch: power means for so operating the friction clutch as to effect, when cooperating with the fluid coupling, a smooth start of the vehicle from rest and a smooth acceleration of the vehicle after a gear meshing operation of said transmission, said power means including a single acting pressure differential operated motor operably connected to the driving plate of the friction clutch; an accelerator for in part controlling the operation of the engine, the friction clutch operating power means and the fluid coupling; valve means for controlling the operation of said motor including a three-way valve for in part controlling the gaseous pressure within that compartment of the motor the gaseous pressure of which compartment controls the operation of the motor, means for actuating said valve including a solenoid and means for controlling the operation of said solenoid including a switch associated with means for operating the gears of the selective gear transmission and an accelerator operated switch said accelerator, through the intermediary of the internal combustion engine, also serving as a control means for the fluid coupling, other valve means for so controlling the clutch engaging operation of the motor as to effect two stages of clutch engaging movement of the power element of said motor, the first stage of movement being relatively fast and terminating when the gaseous pressure within the motor reaches a predetermined factor whereupon the fluid coupling becomes automatically operative to reduce the torque of the driving clutch plate and the second stage of movement of the power element of the motor being relatively slow and cooperating with the fluid coupling to effect a smooth engagement of the clutch as the coupling progressively increases the torque of the driving clutch plate as the engine is speeded up to propel the vehicle.

3. In an automotive vehicle provided with a power plant including an internal combustion engine, a manually operable selective gear transmission, a power operated friction clutch located forwardly of the transmission, said clutch including a driving plate and a driven plate, and a fluid coupling, including an impeller connected to the engine and a rotor connected to the aforementioned driving plate, interposed between the engine and the friction clutch: power means for so operating the friction clutch as to effect when cooperating with the fluid coupling, a smooth start of the vehicle from rest and a smooth acceleration of the vehicle after a gear meshing operation of said transmission, said power means including a pressure differential operated motor operably connected to the driving plate of the friction clutch; an accelerator for in part controlling the operation of the engine, the friction clutch operating power means and the fluid coupling; valve means for controlling the operation of said motor including a valve controlled by the accelerator and other valve means for so controlling the clutch engaging operation of the motor as to effect two stages of clutch engaging movement of the power element of said motor, the first stage of movement being relatively fast and terminating when the gaseous pressure within the motor reaches a predetermined factor whereupon the fluid coupling becomes automatically operative to reduce the torque of the driving clutch plate and the second stage of movement of the power element of the motor is initiated, said second stage of movement being relatively slow and cooperating with the fluid coupling to effect a smooth engagement of the clutch as the coupling progressively increases the torque of the driving clutch plate as the engine is speeded up to propel the vehicle.

4. In an automotive vehicle provided with a power plant including an internal combustion engine, a carburetor for in part controlling the operation of said engine said carburetor including a throttle valve, a manually operable selective gear transmission, a power operated friction clutch located forwardly of the transmission, said clutch including a driving plate and a driven plate, and a fluid coupling, including an impeller connected to the engine and a rotor connected to the aforementioned driving plate, interposed between the engine and the friction clutch: power means for so operating the friction clutch as to effect when cooperating with the fluid coupling, a smooth start of the vehicle from rest and a smooth acceleration of the vehicle after a gear meshing operation of said transmission, said power means including a pressure differential operated motor operably connected to the driving plate of the friction clutch; an accelerator for in part controlling the operation of the engine, the friction clutch operating power means and the fluid coupling; force transmitting means including a lost motion connection interconnecting the throttle valve with the accelerator; valve means for controlling the operation of said motor including a valve controlled by the accelerator and operated, by virtue of said lost motion connection, to close the valve during the first increment of throttle opening movement of the accelerator and before the throttle is opened and other valve means for so controlling the clutch engaging operation of the motor as to effect two stages of clutch engaging movement of the power element of said motor, the first stage of movement being relatively fast and terminating when the gaseous pressure within the motor reaches a predetermined factor whereupon the fluid coupling becomes automatically operative to reduce the torque of the driving clutch plate and the second stage of movement of the power element of the motor is initiated, said second stage of movement being relatively slow and cooperating with the fluid coupling to effect a smooth engagement of the clutch as the coupling progressively increases the torque of the driving clutch plate as the engine is speeded up to propel the vehicle.

5. In an automotive vehicle provided with an internal combustion engine having an intake manifold and a carburetor provided with a throttle valve, a friction clutch having a driving member and a driven member and a fluid coupling having a driving member connected to the internal combustion engine and a driven member connected to the driving member of the friction clutch; power means for operating the friction clutch comprising an intake manifold vacuum operated motor; an accelerator for in part controlling the operation of the engine, friction clutch operating power means and the fluid coupling; an accelerator controlled three way valve for controlling the operation of said motor; a switch connected to the accelerator, said switch constituting a part of the means for controlling the operation of the three way valve; other valve means including a pressure sensitive first stage valve automatically moved to one of its operative positions when the gaseous pressure within the motor reaches a predetermined factor, said other valve means serving to so control the clutch engaging operation of said motor as to effect a plurality of stages of movement of the power element of said motor and a lost-motion connecting means interconnecting the accelecator and throttle valve, the parts of the aforementioned mechanism being so constructed and arranged that when the accelerator is depressed to take up the lost motion the three way valve is operated to initiate a clutch engaging operation of the motor, and the parts of said mechanism being also so constructed and arranged that when the driver depresses the accelerator in a normal manner to open the throttle the first stage valve completes its operation at the same or substantially the same time as the lost motion take-up operation is completed, whereby there is provided a mechanism wherein the throttle is opened to increase the torque of the fluid coupling at the same or substantially the same time as the clutch plates contact one with another.

6. In an automotive vehicle provided with a power plant comprising an internal combustion engine, an accelerator operated throttle for in part controlling the operation of said engine, a friction clutch comprising a driven clutch plate and a driving clutch plate, a fluid clutch, comprising an impeller connected to the engine and a rotor connected to the driving clutch plate, interposed between the friction clutch and the engine and a selective gear transmission connected to the driven element of the friction clutch, power means for operating said friction clutch comprising a pressure differential operated motor unit, said unit including a three-way valve operable to initiate the clutch disengaging and engaging operations of said unit, means including a switch for closing said valve when the accelerator is depressed and for opening said valve when the accelerator is completely released and valve mechanism for so controlling the clutch engaging operation of the motor unit as to effect a relatively fast movement of the driving clutch plate as it moves into engagement with the driven clutch plate and to then effect a relatively slow movement of the driving clutch plate as it moves into firmer engagement with the driven clutch plate, the parts of the mechanism being adapted to effect a completion of the fast movement of the driving clutch plate at the same or substantially the same time the throttle is opened and to effect the slow movement of the driving clutch plate as the throttle is being opened to increase the speed of the rotor.

7. In an automotive vehicle provided with an internal combustion engine having a throttle, an accelerator, means interconnecting the throttle with the accelerator, a switch operated by said latter means, a friction clutch, a three-speeds forward and reverse transmission connected to the driven element of said friction clutch, a fluid clutch comprising an impeller connected to the engine and a rotor connected to the driving element of the friction clutch, power means for operating the friction clutch comprising a pressure differential operated motor unit having its power element operably connected to the driving element of the friction clutch and means for controlling the operation of the motor unit comprising a three-way valve controlled in part by the aforementioned switch and operative, when the accelerator is completely released and the transmission is in any position except high gear, to initiate a clutch disengaging operation of the motor unit and then operative when the accelerator is slightly depressed, and before the throttle is opened, to initiate a clutch engaging operation of the motor unit, the parts of the mechanism being adapted to effect a contact of the driving and driven plates of the friction clutch at the same or substantially the same time the throttle is opened.

THOMAS L. MAYRATH.